United States Patent
Yeger et al.

(10) Patent No.: US 6,317,751 B1
(45) Date of Patent: Nov. 13, 2001

(54) COMPLIANCE ARCHIVAL DATA PROCESS AND SYSTEM

(75) Inventors: David Yeger, Lakewood; Jay Kliegman, East Brunswick, both of NJ (US); Roger Cicconi, Levittown, PA (US); Gafar Lawal, Plainfield; Rick Myers, Bridgewater, both of NJ (US)

(73) Assignee: Merrill Lynch & Co., Inc., New York, NY (US)

( * ) Notice: Subject to any disclaimer, the term of this patent is extended or adjusted under 35 U.S.C. 154(b) by 0 days.

(21) Appl. No.: 09/162,435

(22) Filed: Sep. 28, 1998

(51) Int. Cl.[7] ............................. G06F 17/30; G06F 7/00
(52) U.S. Cl. ....................................................... 707/104
(58) Field of Search .................................. 707/104, 100, 707/101, 204; 709/203, 217, 201, 200

(56) References Cited

U.S. PATENT DOCUMENTS

| 5,006,978 | * | 4/1991 | Neches ................................. 364/200 |
| 5,727,129 | * | 3/1998 | Barrett et al. ............................ 6/96 |
| 5,809,242 | * | 9/1998 | Shaw et al. ........................... 395/200 |
| 5,812,639 | * | 10/1999 | Kolling et al. .......................... 705/40 |
| 5,860,068 | * | 1/1999 | Cook ...................................... 705/26 |
| 5,867,821 | * | 2/1999 | Ballantyne et al. ..................... 705/2 |
| 5,890,163 | * | 3/1999 | Todd .................................... 707/200 |
| 5,892,909 | * | 4/1999 | Grasso et al. ................... 395/200.31 |
| 6,014,502 | * | 1/2000 | Moraes ................................ 395/200 |
| 6,023,345 | * | 2/2000 | Bloomfield .......................... 358/402 |
| 6,044,205 | * | 3/2000 | Reed et al. ...................... 395/200.31 |
| 6,058,389 | * | 5/2000 | Chandra et al. .......................... 707/1 |
| 6,073,142 | * | 6/2000 | Geiger et al. ......................... 707/500 |
| 6,088,717 | * | 7/2000 | Reed et al. ........................... 709/201 |

* cited by examiner

*Primary Examiner*—John Breene
*Assistant Examiner*—Linh Pham
(74) *Attorney, Agent, or Firm*—Hopgood, Calimafde, Judlowe & Mondolino, LLP (57) ABSTRACT

A computer system for enhanced management and archiving of select data types includes algorithms for transforming the data types into special system recognized objects and associated meta-data. High volume archiving is accomplished at low costs and substantially facilitated retrieval. The system is particularly useful in managing electronic message systems for institutions complying with regulatory requirements.

5 Claims, 11 Drawing Sheets

COMPLIANCE ARCHIVAL DATA PROCESS AND SYSTEM

FIELD OF THE INVENTION

The present invention generally relates to data processing systems and apparatus for coordinated archiving of large volumes of select data types. More specifically, the present invention relates to systems and software for automated, rule based storage and access of electronic based communication data.

BACKGROUND OF THE INVENTION

Most large scale institutions now rely on network based electronic mail systems to facilitate communication amongst their staff. In the last few years, "e-mail" has become as ubiquitous as the telephone as a vehicle of communication. It is not unusual for users of e-mail to generate dozens of messages per day. These messages will invariably deal with mundane matters such as meeting schedules, lunch orders and the like. In addition, e-mail will include mission critical communications and notifications going to the very heart of the business endeavors of the institution.

In a large sense, the volume of e-mail is now displacing communication that was otherwise recorded in hard copy— on paper—and, therefore, a permanent record. Paper recorded communications, while more expensive and time consuming to create and circulate, had the advantage of simple retention for later confirmation.

In fact, in several industries subject to governmental regulations regarding archiving records, significant rules and procedures have been instituted and mandated so that the paper records of communications relating to certain specific subjects are retained for select proscribed periods. An example of this exists in the securities industry. Companies involved with security transactions on behalf of customers, such as stock and bond trading, are required to maintain records of their communications with their customers and relating to their customer accounts.

In the past, maintaining these records and staying in compliance with the regulations involved a series of protocols relating to the retention of paper copy communications corresponding to time periods set by the regulators. For the big banks and brokerage houses, large stores of paper records were routinely generated. As their volume grew, the records were transferred to other forms of recorded media, such as microfiche and the like. This met the regulations, and substantially reduced costs. However, accessing stored records was a time consuming and difficult process, mostly because of the difficulty and expense in tracking and retrieving individual documents from a large volume of similarly formatted information.

With the advent of e-mail, many communications that are subject to the current retention regulations are now communicated electronically without a corresponding physical, paper copy. While some of the messages are printed to, hard copy and then stored, a vast majority are not, and thus exist in electronic storage media, often in a random ad hoc fashion. In particular, storage on a hard disk leaves the original message in a somewhat tenuous condition. Hard drives are prone to periodic failure and data loss. In addition, text based messages are subject to editing and thus there may be some question on whether the original message exists unaltered.

Perhaps more difficult are the problems associated with subsequent retrieval of e-mail based communications. There are several dimensions to this problem. The first relates to the volume of e-mail that is generated. It is enormous and growing rapidly. While text based e-mail is subject to common formatting protocols, recent e-mail volume includes a growing percentage of file attachments such as image files, spreadsheets, graphics, and the like. In the future, and as communication bandwidth increases, these attachments will further include multimedia elements such as audio clips and video segments. Accordingly, efforts to comply with current regulations cannot be simply handled by hard copy creation and storage.

In addition, storage and archiving requirements are often source, recipient, and/or content specific. That is, the length of time a message must be retained often depends on the parties to the communication and the subject matter of the message author. For example, client communications are often stored for periods up to ten years, while internal communications are stored for periods up to four years. Some messages will be accessed soon after generation, while others may only be accessed years after generation - in the course of some dispute resolution. Finally, the messages must be stored such that there is no question about subsequent alteration.

Presently e-mail is often handled by simply storing a log of all e-mail on a central server. A supervisor reviews random pieces of e-mail in the log on some periodic basis, by browsing the log to insure compliance with standing regulations. On a periodic basis (monthly) the log is purged of data that is more than, e.g. 30 days old. This information is then copied to optical disk (non-volatile storage).

This process has many shortcomings. Retrieval involves a huge manually intensive search effort. The process does not result in the non-alterable format demanded by most regulators. The process is time consuming and of questionable accuracy. No trail of the reviewing process is provided, thus making it difficult to establish compliance to regulators.

It was with an understanding of the problems outlined above that led to the present invention.

OBJECTS AND SUMMARY OF THE PRESENT INVENTION

It is an object of the present invention to provide a computer system that records and archives large volume institutional data-types generated in a random stochastic manner.

It is another object of the present invention to provide a data processing method for system wide management of data storage requirements pursuant to program controlled logic operation.

It is still another object of the present invention to provide a computer system coupled to a non-alterable storage media that operates to collect, parse and store select data-types in accordance with program controlled protocols.

It is yet another object of the present invention to provide a parsing processor that creates meta-data objects that include select data from the source data object and is stored separately to provide enhanced recall.

It is another object of the present invention to provide a component based architecture that can be efficiently scaled.

It is a further object of the present invention to provide a system that integrates existing hierarchical storage management system that stores select data in an incremental fashion to different levels of storage media having different recall characteristics.

It is yet a further object of the present invention to provide a data processing system for managing e-mail communications and storing select e-mail messages in accordance with system logic mandates.

The above and other objects of the present invention are realized in a computer system operated in conjunction with a network for managing the archiving process associated with select data types such as e-mail. The inventive computer system operates by establishing a central e-mail log where copies of all e-mail communications are stored on an interim basis. Processing of e-mail messages stored on the log is time based and includes an initial parsing operation wherein select fields are extracted from the e-mail and combined with the message and other descriptive parameters to create a meta-data compiled object, called the CAR object.

The CAR object is separately stored in magnetic media, and processed by the HSM (hierarchical storage management system). This data is backed up by associated optical disk arrays—at select times, typically during off hours. System protocols are such that the meta-data extracts are stored to non-alterable media within 24 hours of transmission to the central e-mail log. To facilitate near term retrieval, a copy of the items are left in magnetic disk cache for up to 30 days.

In accordance with the varying features of the present invention, the system permits rapid searching of off line message storage. In addition to the optical storage of the CAR object, the associated meta-data is further stored in a DB2 database; other relational database systems may be used. By placing the meta-data in the DB2 database, search engine access to the information descriptors in the meta-data can be implemented, ultimately allowing convenient access to the underlying off line message.

The foregoing features of the present invention are better understood by review of an illustrative embodiment thereof as described here in conjunction with the following diagrams:

DETAILED DESCRIPTION OF THE INVENTION

First briefly in overview, the present invention provides a data processing system for managing large volume of data types typically generated during normal business activities. While not so limited, the present preferred embodiment is directed to the management of e-mail message archiving at large institutions in the financial services sector. Accordingly, the discussion of the system herein is directed to implementing the invention on an e-mail archiving requirement, with the data types being e-mail messages sent to or received by individual work stations located within a network environment.

Operation is, at the start, event driven. E-mail messages are duplicated and stored on a local server in a separate log. In particular, outgoing e-mail is written to the log upon sending. In a somewhat different fashion, incoming e-mail is stored in a local mailbox and sent to the central log. On a periodic basis, usually during off-hours, the log is copied to a separate CAR server and then erased. The messages on the CAR server are then converted into CAR objects. This involves the selective extraction of message field data to create an associated packet of meta-data. The meta-data extract is combined with the message, formatted in a system protocol and encapsulated to form the CAR object.

The CAR object is then placed on the CAR storage outbound queue, and stored in sequence to an array of "worm" (write once, read many) optical storage media, forming the archive. In addition, the meta-data is place in a DB2 database. The meta-data structure and database storage operates to facilitate future retrieval of the stored message.

Figure 1:
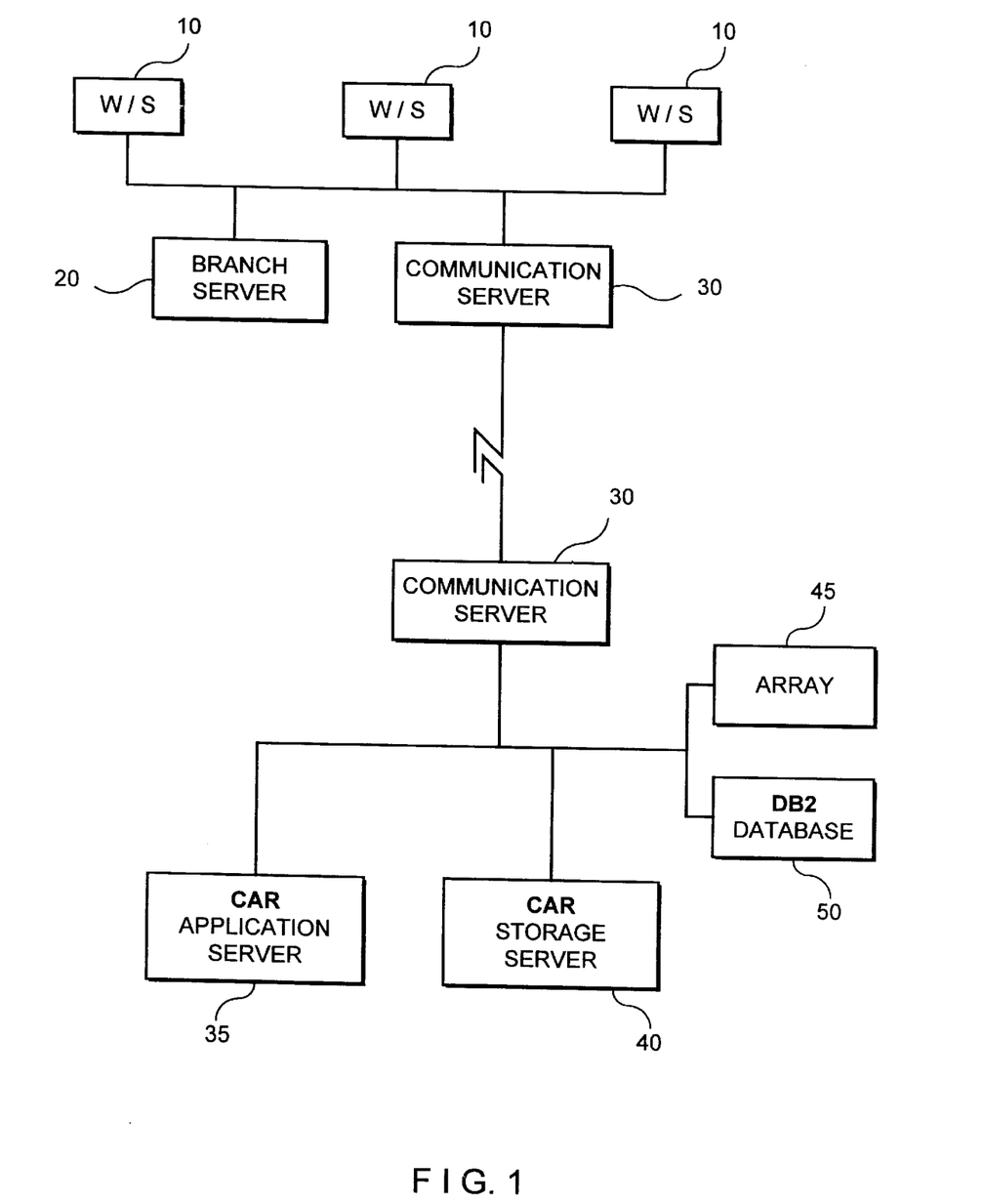
FIG. 1 depicts a physical component diagram of the present invention.

With the foregoing brief discussion in mind, attention is now directed to FIG. 1, a block diagram representation of the hardware environment associated with implementing the present invention. The typical arrangement involves a local area network (LAN), linking together a plurality of separately programmed workstations, 10 each connected to at least one network supporting server 20.

The branch server is linked to the central CAR server 30 which forms the communication bridge for passing e-mail messages to the central site for temporary storage on the central server log. At system defined intervals, the messages are passed to the CAR application sever, 35, which implements a data conversion operation, discussed in more detail below, and transfers the resulting CAR object to the CAR storage server 40. Again, in accordance with system logic, the storage server controls the writing of the CAR object to the optical jukebox, 45 which is an array of optical storage disks. In addition, the CAR meta-data is sent to the DB2 database 50 for separate storage.

The system infrastructure (hardware and software) is delineated in Table I below:

TABLE I

1. CAR server
    Hardware:
        Compaq 6500 R
        4 Pentium Pro
        1 Gb RAM
        2 Smart SCSI Controller
        2 × 2 × 4.3Gb Raid 1
        4 × 4.3Gb Raid 1
    Software:
        NT 4.0 w/Service Pack 3
        Option Pack
2.   1. Storage Server
        Hardware:
        Compaq 7000 R
        4 Pentium Pro
        512 Mb RAM
        External Storage Unit w/8 18.1 Gb (2 × 4x Raid 5)
        Internal Storage:
            4 × 9.1Gb - data
            2 × 4.3Gb - log

TABLE I-continued

```
        2 × 4.3Gb - O.S.
        4 × 9.1Gb - MSMQ
        3 Smart SCSI Controllers
        2 × 2944W Adaptec SCSI
        2 IBM 3995 C-68 Optical Jukeboxes
        Software:
        NT 4.0 w/Service Pack 3
        Option Pack
        IBM DB2 Universal Database client
        ADSM client
        SQL Server
        DFS
        OTG Disk Extender
    3.  Database Server
        Hardware:
        Compaq 6500 R
        2 Smart SCSI Controllers
        External 4 × 9.1Gb (27Gb available)
        Internal Storage:
        2 × 4.3Gb - log
        2 × 4.3Gb - O.S.
        2 × 4.3Gb - dump
        Software:
        NT 4.0 w/Service Pack 3
        Option Pack
        IBM DB2 Universal Database
        ADSM Client
    4   Enterprise Controller
        Hardware:
        Compaq 850R
        128Mb RAM
        2 × 4.3Gb Raid 1
        Smart SCSI Controller
        Software:
        NT 4.0 w/Service Pack 3
        Option Pack
```

Many of the components supporting the above-noted capabilities of the present invention are distributed commercially. Table II below lists commercially available systems:

TABLE II

Commercial Components:

1. Microsoft ® NT 4.0 Enterprise Server- all boxes
2. Microsoft ® Transaction Server (MTS) - all boxes
3. Microsoft ® Message Queue Server (MSMQ) - all boxes
4. IBM ® DB/2 Universal 5.0 (DB2 UDB) - Storage Server; client on retrieval diagram
5. OTG (Object Technology Group) Disk Extender (DE) - Storage Server #2
6. Microsoft ® SQL Server - Storage Server #2
7. Microsoft ® Distributed Component Object Model (DCOM)
8. IBM ® - ADSTAR Distributed Storage Manager (ADSM)
9. Microsoft ® Management Console (MMC)

Figure 2:
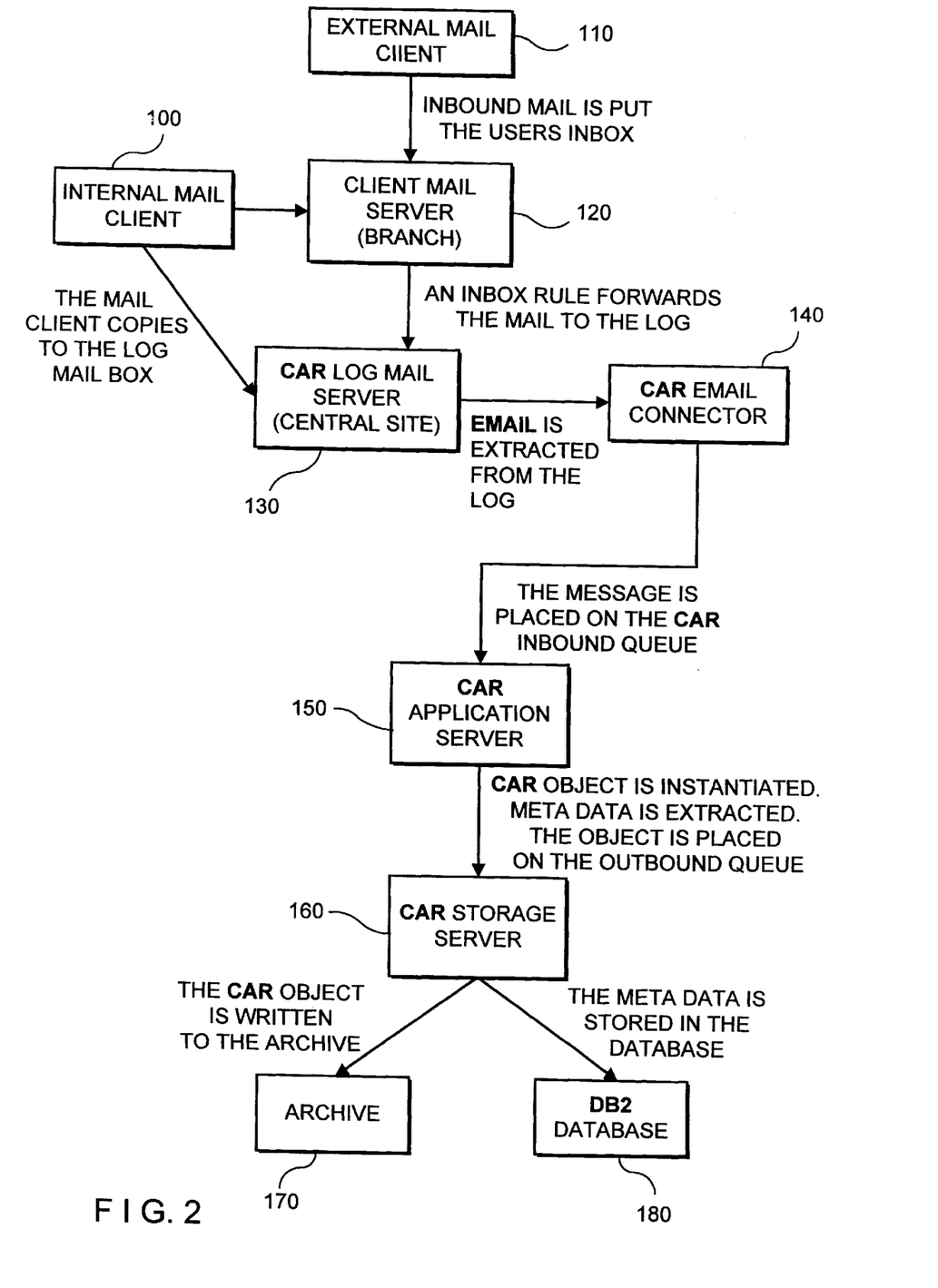
FIG. 2 depicts a functional block diagram of the present invention.

Turning now to FIG. 2, the functional aspects of the components forming the inventive system are depicted in block diagram format.

Beginning with block 100, E-mail is managed on an internal client work station by a "mail client" software package such as Outlook® by Microsoft®, or Endora Pro® by Qualcomm®. Similarly, external E-mail sources are handled by E-mail manager block 110. E-mail messages are copied onto the CAR Log Mail Server 130, either directly, or via the Branch Server 120.

On a periodic basis, E-mail on the central log 130 is extracted by the E-mail collector 140 and each message is placed on the inbound queue, for CAR application server 150. As is discussed in more detail below, the Application Server includes programming logic to facilitate translation of the message into al conforming CAR object. This involves selection extraction of specific fields to form a meta-data text file. For the preferred E-Mail application, this meta-data will comprise the data fields from the original message as depicted in Table III.

TABLE III

1. Sender
2. Recipients (addressee, cc's)
3. Subject matter
4. Time sent
5. No. of attachments
6. Message size
7. CAR received time
8. Imbedded unique identifier
9. NT USER ID; Location Code (branch ID)*
   Archive Date/Name
   Date Sent
   Date Received

*If available; otherwise default value inserted.

The foregoing data is encapsulated with the full message to create the CAR object. This object, itself, is given a separate unique identifier, for coordinated management, during storage and retrieval.

Returning now to FIG. 2, the application server 150 places the conforming CAR object on the outbound queue, ready for archiving. Actual archiving is accomplished in sequential fashion via CAR storage server 160. Actual CAR objects are placed in storage in the archive 170, while the associated meta-data is placed in the DB2 Database 180.

Figure 3:
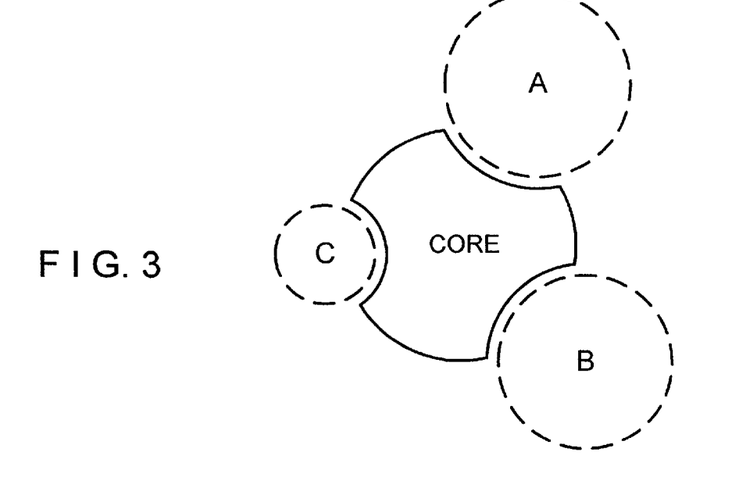
FIG. 3 depicts the CAR application framework for formatting and encapsulation processes of the present invention.

Turning now to FIG. 3, a conceptual diagram is presented that depicts in broad terms the architecture applied in the controlling programming logic of the present invention. Specifically, the program includes a core coding segment that includes a generic set of functions and operating parameters. This core code provides those features and operating characteristics that are common among the various data-types that the system will process. Data-types will include e-mail messages, faxes, and the like.

At various times during processing, the core is augmented with extensions. Three exemplary extensions are depicted in FIG. 3. For example, when the data-type under processing is an e-mail message, extension A is called from its dormant state and appended to the core. This allows for introduction of e-mail specific code that will allow processing of e-mail data-type attributes, such as formatting, meta-data field locations, queuing properties and the like. To the extent no specific extension is provided, the core utilizes stored default values to permit processing to continue.

The processing logic of an exemplary system is depicted in FIGS. 6–9 which relates to an e-mail archiving process. While specific to e-mail, the presentation is solely an illustrative example of the application of the inventive system and process to a specific data-type. Processing is transaction based and the system operates on a single transaction in accordance with the set tasks and requirements. Logic begins conceptually at block 400 with the system waiting for a transaction initiating event—in this case, the receipt of an e-mail message. At block 410, the e-mail message arrives and the first transaction for this data-type is started. Typically, the e-mail conforms to one of several commercial protocols, e.g., Microsoft Exchange—with the filename.msg structure. At block 420 the e-mail message is parsed and a collection of message properties extracted and placed in a meta-data format, prt(I); the entire message is separately parsed as the originating format, MSG(I) at block 430. The message content and properties are then combined at block 440 into an encapsulated object, EM(I) which is assigned a unique identifier to facilitate tracking. The object EM(I) comprises an envelope of code that allows for proper transmission and handling by the following processes.

Figure 6:
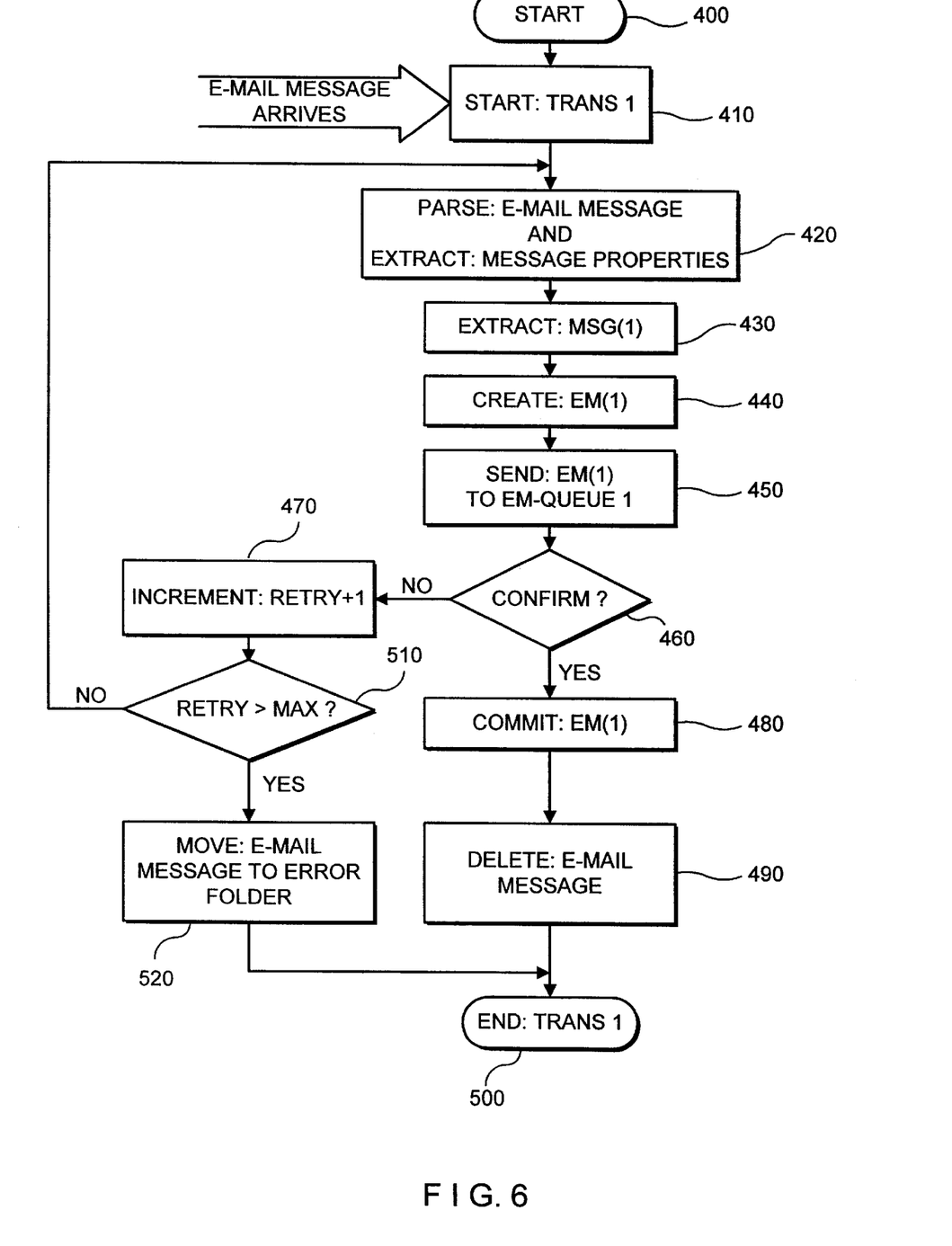
FIG. 6 depicts the logic flow for the system during transaction 1.

After its creation, EM(I) is sent to the e-mail queue for processing, block 450. In this context, the queue is labeled E-Queue1 and is the memory location in the central server for stacking the incoming archiving objects to allow sequential processing into the storage facility. This is followed by confirmatory test 460, wherein the system assures itself that the incoming message has been properly handled, translated into the necessary format, and finally, delivered to EM-Queue1.

A positive response to test 460 continues logic to block 480 and E(I) is committed; at block 490, the initiating e-mail message is then deleted from the server memory. A negative response to test 460 indicates that the process has failed at some step. Accordingly, logic is branched to the error routine, starting with block 470—error trial counter (increments retry counter, R=R+1). If the retry number is below the maximum stored value, the system returns to block 420 and the parsing, creating, queuing process is repeated as delineated above. After several tries, set by the maximum value, a positive response to test 510 directs logic to block 520 and the e-mail message is sent to an error folder for subsequent processing. In either event, the transaction is terminated at block 500, end Trans(I).

Figure 5:
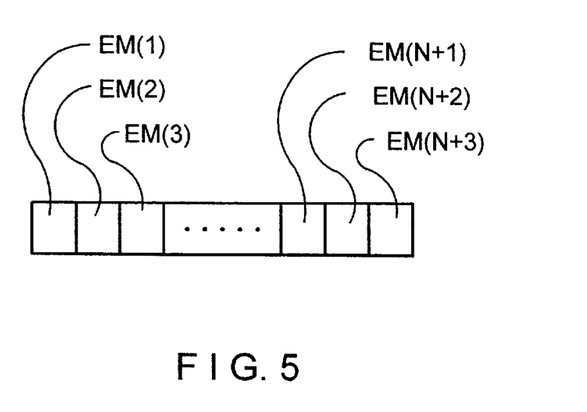
FIG. 5 depicts a logic flow diagram for the data retrieval sequence of the present invention.
Figure 7A:
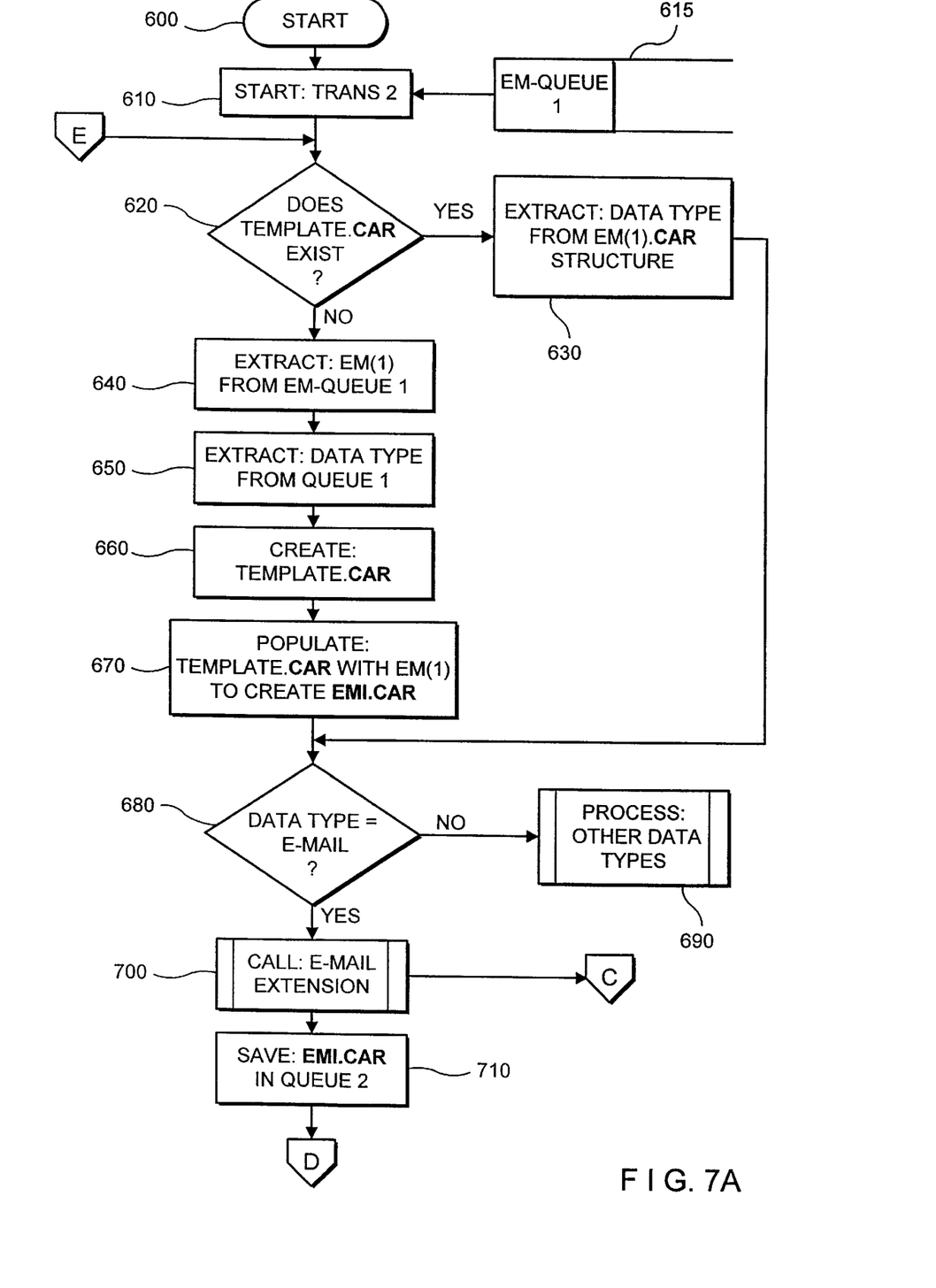
FIGS. 7A–7C depicts the logic flow for the system during transaction 2.

The next transaction is described in FIG. 7, and is directed to the creation of the properly formatted CAR object for archiving. Logic begins conceptually at start block 600 with the system waiting for entries from EM-Queue1. The structure of this queue is shown conceptually in FIG. 5 with a stack of sequential objects aligned and waiting for processing within Transaction 2.

Returning to FIG. 7, processing starts via block 610 with the selection of the next EM(I) from the queue and test 620 wherein the system decides whether a CAR template exists for the data-type; if yes, logic branches to block 630 which extracts the data-type from the CAR object for subsequent use. Test 620 is necessary primarily because of the possible horizontal scaling of processing available to handle the volume expected in a CAR installation. For example, as volume increases, twenty servers operating in parallel could be used to handle this volume, with an allocating front end passing queued objects to the least used server. As the workload is channeled down to the final servers in the sequence, the objects already processed must be filtered, via test 620 to avoid duplicate processing.

Figure 4:
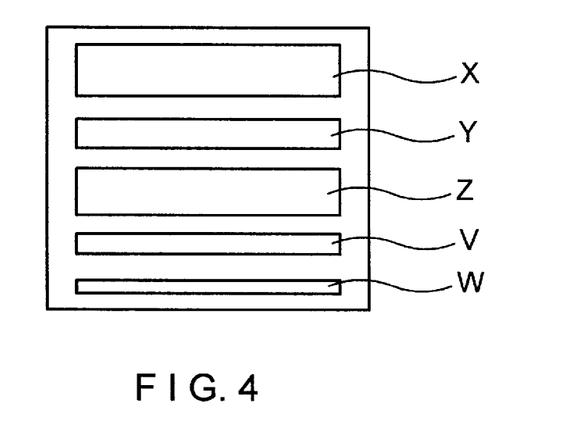
FIG. 4 depicts a logic flow diagram for the storage sequence for operation of the present invention.

Assuming, however, a negative response to test 620, logic continues to block 640 and the removal of EM(I) from the queue. In addition, the data-type is extracted from the queue, block 650, and the system creates the associated template, at block 660. A representation of this template is depicted in FIG. 4, with select fields (X, Y, Z . . . , etc.) corresponding to specific data and data sources. For example, field X will contain Core data generic to all data-types; Y will comprise the entire data-type object; and Z will comprise the data-type unique identifier and meta-data. Accordingly, the system then populates these fields with the data taken from the EM(I) object to form the EM(I).CAR—the specific CAR object having formatting, structure and data to permit subsequent archiving. This occurs at block 670; at test the system determines whether the data type conforms to that associated with the e-mail data-type. If yes, logic continues to block 700 and makes a call to the extension necessary to implement that data-type.

Figure 7B:
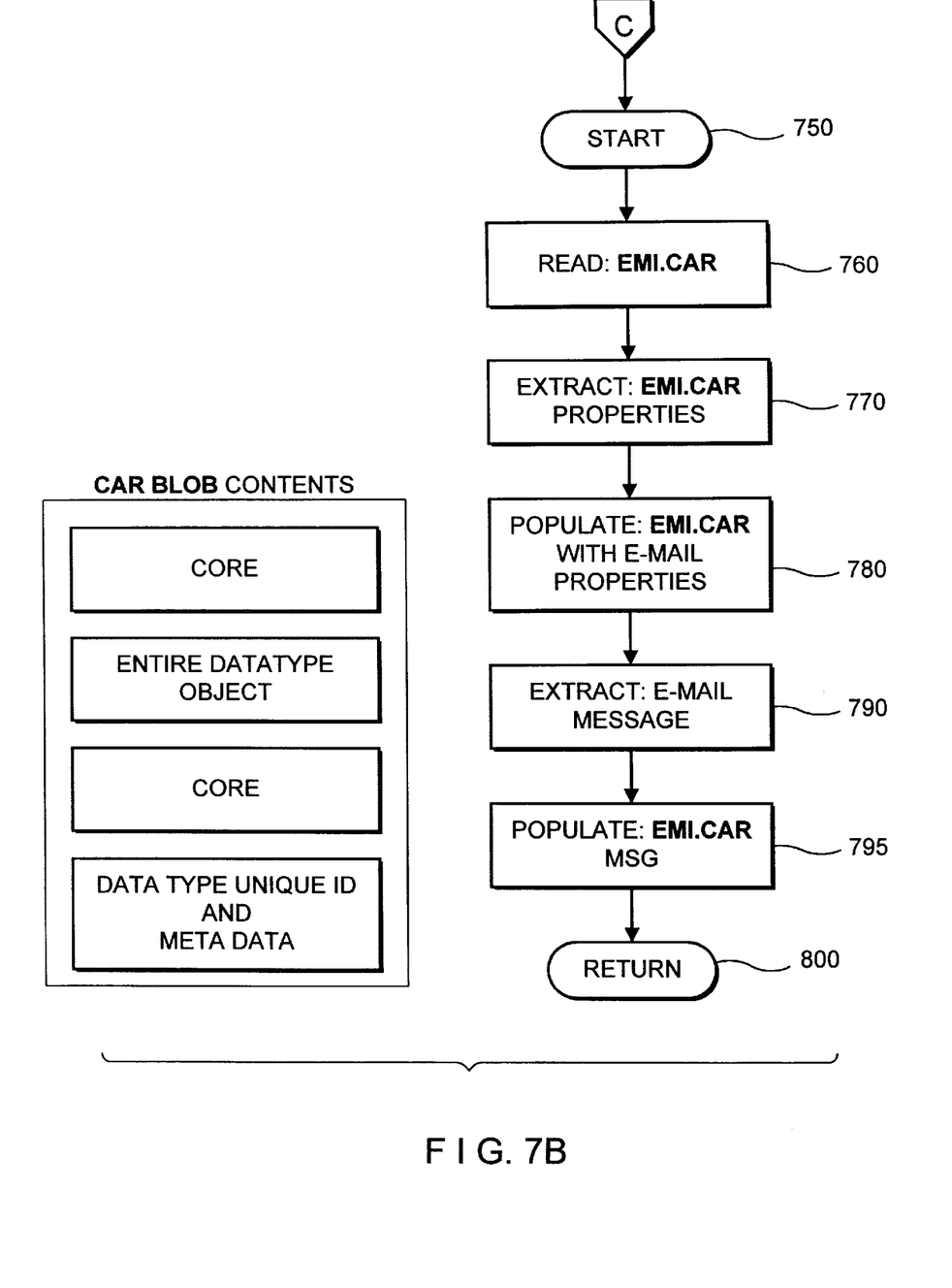

This call operation is depicted in FIG. 7B and begins with start block 750 followed by Read command, block 760, directed to the EMI.CAR object. At block 770, the object properties are extracted and at 780, additional properties are placed in select fields associated with the object. These properties relate to e-mail specific characteristics.

Continuing with FIG. 7B, the system then extracts the e-mail message, block 790 and using this, the EM(I).CAR msg is formed and filled, block 795. Logic returns to the main branch at block 800, and referring back to FIG. 7A, block 710, the EM(I).CAR object is placed in the next queue, Queue 2. Logic then branches to subroutine D, depicted in FIG. 7C.

Figure 7C:
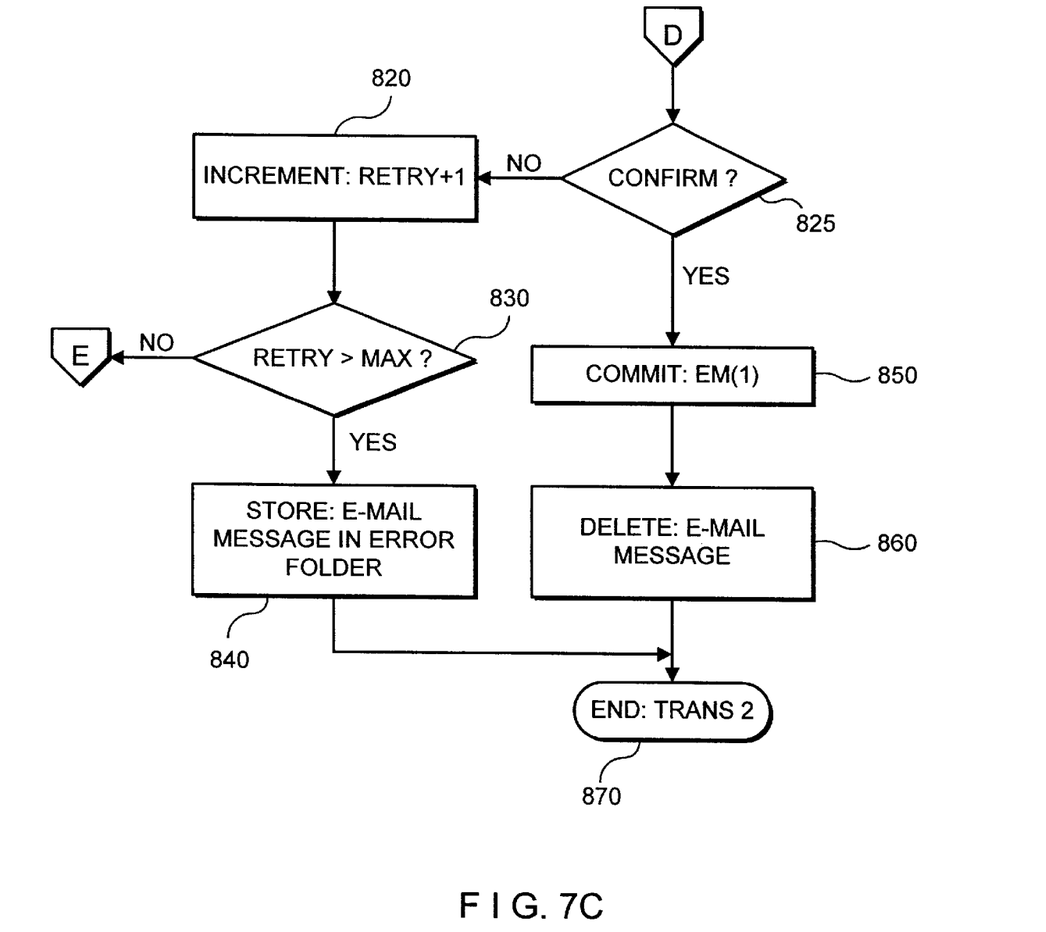

Turning now to FIG. 7C, processing begins with test 825, to confirm entry of the object into the next queue in sequence. If no, logic branches to block 820 and the retry counter is incremented. At test 830, the system decides if the retry attempt is over the set maximum. If yes, the system stores the e-mail message in the error folder, block 840. If no to test 830, logic branches to logic insertion point E, above test 620 of FIG. 7A.

Returning to test 825 of FIG. 7C, a positive response sends logic to commit block 850; this occurs if the above processes are successfully implemented. Only then will the system delete the e-mail message, block 860. At block 870, transaction 2 is terminated for that object and the next in queue starts the process again.

Figure 8A:
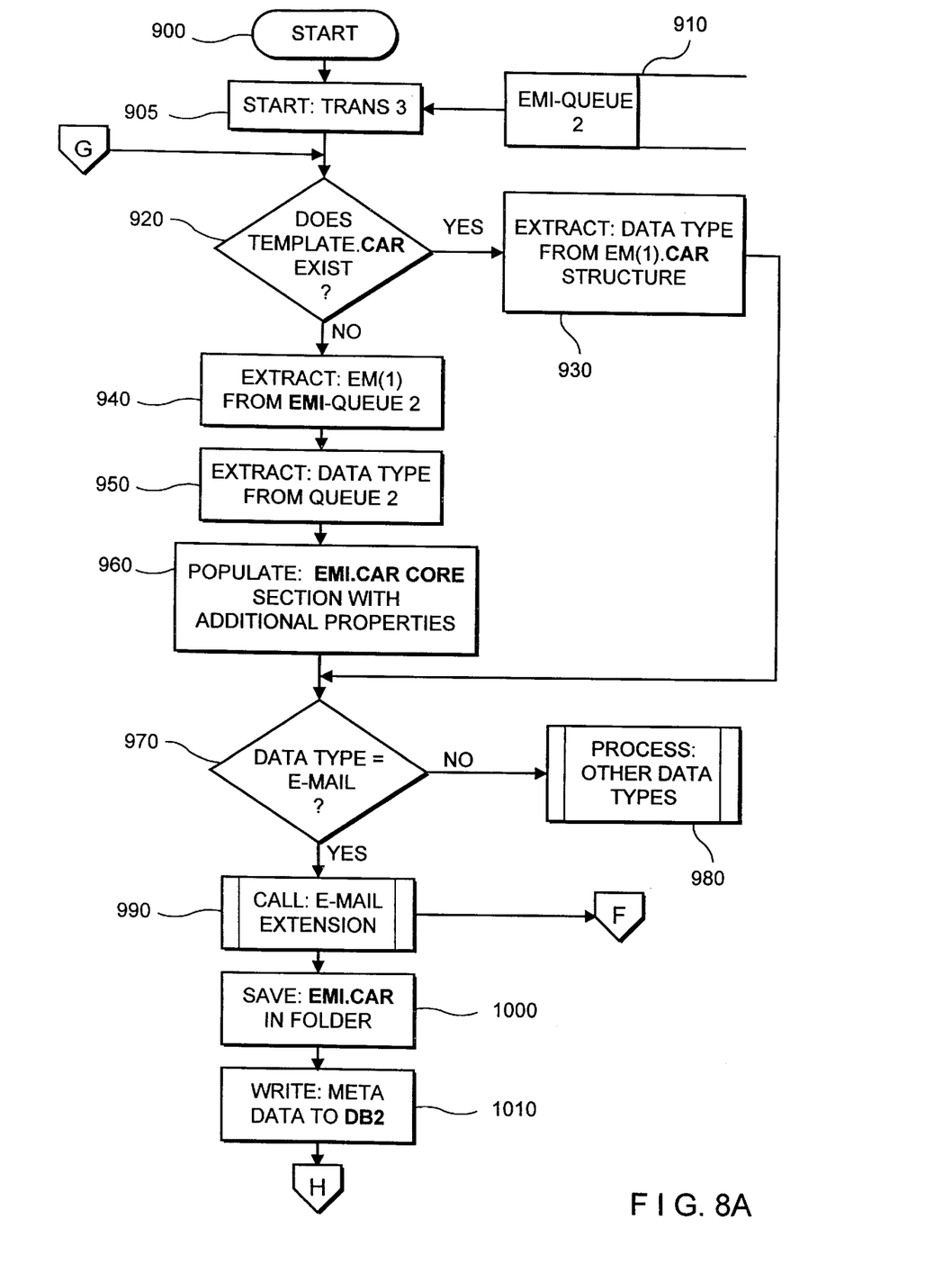
FIGS. 8A–8C depicts the logic flow for the system during transaction 3.

Turning now to FIG. 8A, the next transaction is described in logic diagram form. Beginning at start block 900, logic takes the next pending object from queue 2 at block 910, and test 920 determines if a CAR template exists for the object. This process is essentially identical to that depicted in FIG. 7 and in fact uses the same base code, only applied at a latter stage of processing. At this stage, transaction 3, a different group of data is written into the CAR object, and may include information retrieved from corporate databases relating to the e-mail sender, such as e-mail address, and the like. Accordingly, if no template exists for the new data, the system processes blocks 940–960 to properly populate the CORE section with these new properties.

Again, the system confirms that the data-type is an e-mail data-type, test 970; if not, logic is directed to a separate implementation of CAR—one using the same base code but with extensions tailored to the data-type (e.g., fax message, etc.—See FIG. 3 and discussions, supra).

Figure 8B:
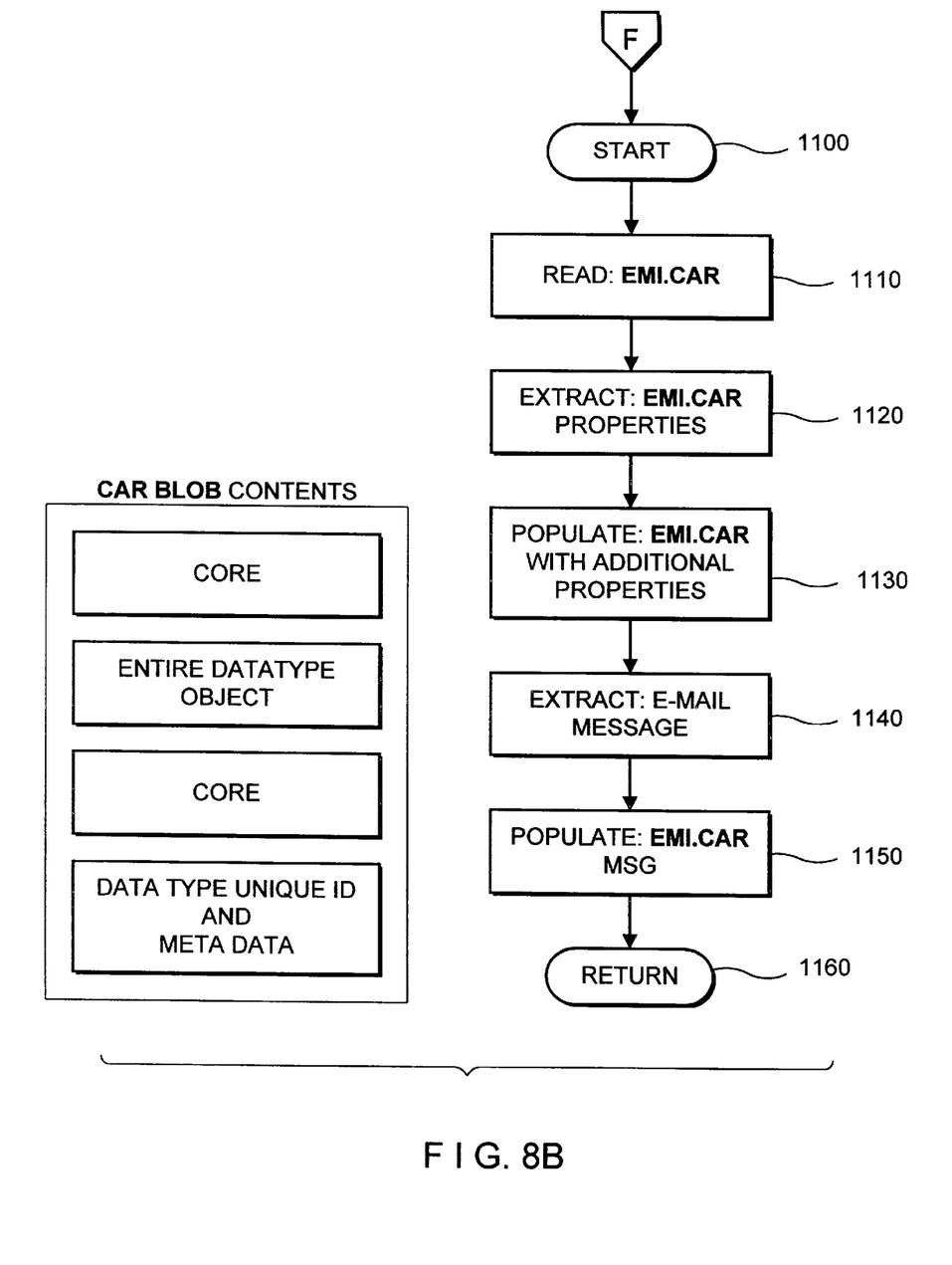
Figure 8C:
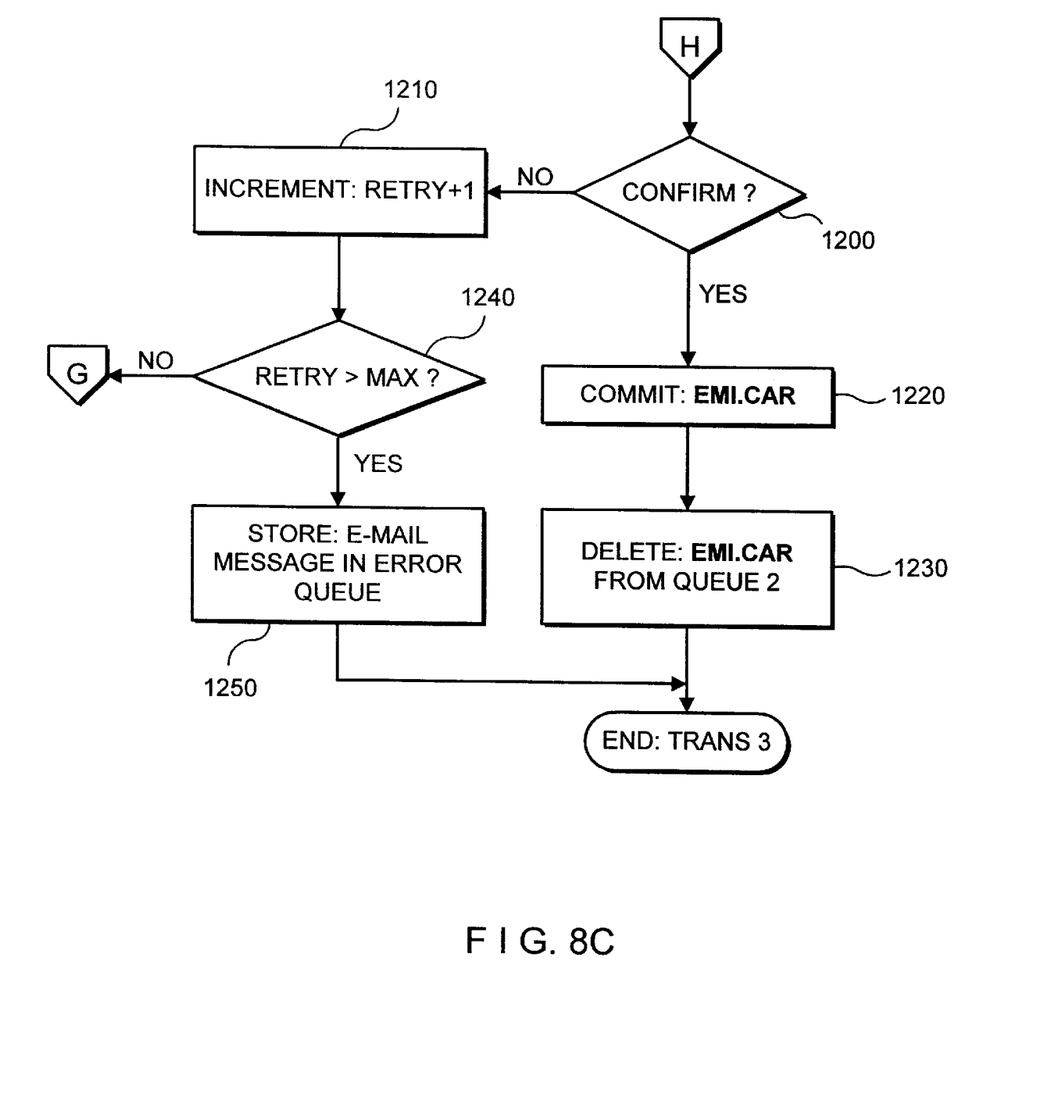

Assuming an e-mail data-type, logic continues to block 990, and the subroutine call to the operation extension, utilizing the logic depicted in FIG. 8B. Turning now to this figure, (labeled "F"), this extension operates in essentially identical fashion to that depicted above with FIG. 7B; for this extension, however, the properties pulled from and sent to the object depend on the transaction 3 specifications. For transaction 3, the properties extracted are exemplified by employee information and those populated on the object are information such as employee number, SSN, etc. This is accomplished in the sequence delineated via blocks 1110–1150; with return to the main routine via block 1160.

Continuing with FIG. 8A, the CAR object, EM(I).CAR is stored, block 1000 after completion of the extension subroutine. In addition, the system writes the extracted and configured meta data to the associated database, DB 2, block 1010. Logic then continues to FIG. 8C, and test 1200. Again, FIG. 8C parallels the procedures of FIG. 7C to insure proper storage of one and only one CAR object associated with the incoming message.

The final stage of operation relates to the actual nonvolatile storage of the objects in fixed storage media—such as optical storage. This process is delineated in FIG. 9, and begins with the record trigger event. Two exemplary triggers are depicted as bold arrows into the logic. Recording off the magnetic cache is accomplished at select time of day, month or other time interval; in addition, storage is triggered by cache full designations.

Figure 9:
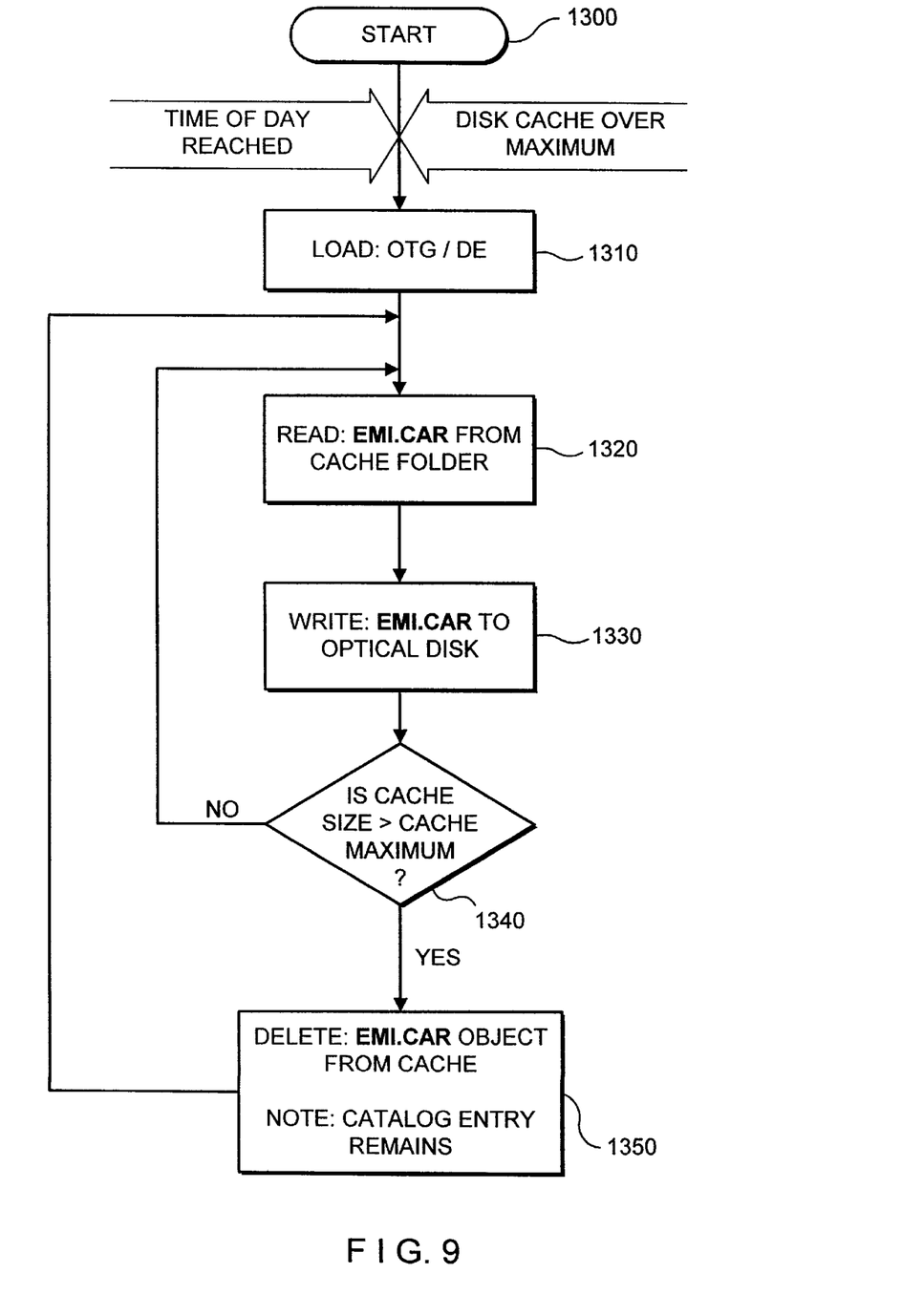
FIG. 9 depicts the logic for the data storage process.

At block 1310, the process for storage is loaded, and the first CAR object read from the queue in the cache folder, block 1320. At block 1330, the system writes the object to optical storage, and test 1340 determines whether the cache is now below the maximum amount that will trigger the storage process. A positive response to test 1340 continues logic to block 1350 and the system erases those entries now recorded on optical storage. The decision on what entries should be erased depends on the type of entry, source and length of time on the system with the objective that logic attempts to retain on magnetic memory those entries likely to be recalled soon or often.

A separate aspect of the system operation relates to the retrieval process. This is accomplished by keyword search of the DB2 database for matching entries. A list of matching entries is outputted and the search results used to locate and recall the actual CAR objects of optical storage. The object is parsed through a translator and the original message in its original, unaltered format presented.

Although the invention has been described in detail for the purpose of illustration, it is to be understood that such detail is solely for that purpose and that variations can be made therein by those skilled in the art without departing from the spirit and scope of the invention.

What is claimed is:

1. A computer processing method for archiving data processed in a network environment, the method including the steps of:

(a) storing, on a server, files corresponding to a first data type;

(b) accessing the stored files and processing the stored files by extracting a subset of data available for characterizing the contents of the stored files to thereby generate characterizing data;

(c) processing the characterizing data into a known format and storing the processed characterizing data in a relational database;

(d) processing the stored files to conform to a file template; and (e) storing the processed stored files in a non-volatile storage media, wherein the stored files are processed utilizing an architecture comprising a core coding segment corresponding to the first data type.

2. The method of claim 1 wherein said core coding segment is augmented by data type specific coding extensions.

3. The method of claim 2 wherein one of said extensions include e-mail specific functionality.

4. The method of claim 3 wherein the e-mail characterizing data comprises sender, recipient, subject matter, when sent, number of attachments, message size, and an embedded unique identifier.

5. The method of claim 4 wherein said unique identifier is used to prevent duplicate storage of e-mail messages.

* * * * *